(No Model.)
A. MILLER & J. N. KAILER.
TOOL FOR CUTTING CLOVER HULLER DETAINERS.
No. 302,759. Patented July 29, 1884.
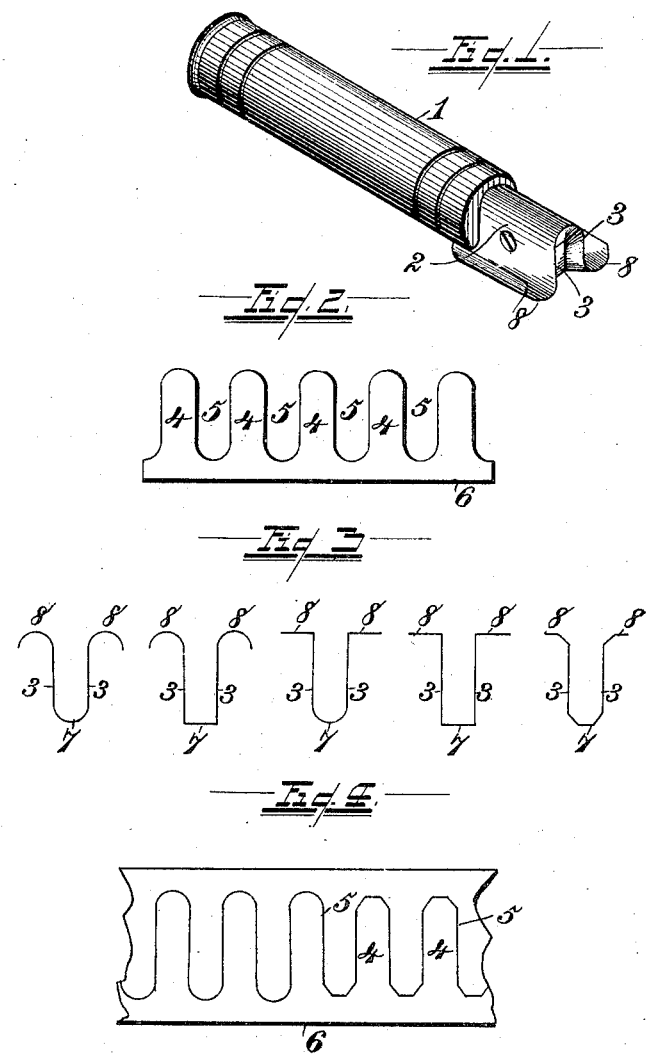

UNITED STATES PATENT OFFICE.

ABRAHAM MILLER AND JOHN N. KAILER, OF NEWARK, OHIO, SAID MILLER ASSIGNOR TO THE NEWARK MACHINE COMPANY, OF SAME PLACE.

TOOL FOR CUTTING CLOVER-HULLER DETAINERS.

SPECIFICATION forming part of Letters Patent No. 302,759, dated July 29, 1884.

Application filed May 26, 1884. (No model.)

*To all whom it may concern:*

Be it known that we, ABRAHAM MILLER and JOHN N. KAILER, of Newark, county of Licking, State of Ohio, have invented a new and useful Improvement in Tools for Cutting Clover-Huller Detainers; and I do declare the following to be a full, clear, and exact description of the invention, such as will enable others skilled in the art to which it pertains to make and use it, reference being had to the accompanying drawings, which form a part of this specification.

This invention has for its object to provide a novel implement for cutting what are known as "detainers," which are used between the lags of clover-hulling cylinders.

The invention consists in the novel construction of the cutting-tool, hereinafter described and claimed, whereby a single cut will form one of the throats and the sides and portions of the ends of the two adjacent tongues.

The invention is illustrated in the accompanying drawings, in which Figure 1 is a perspective of a cutting implement embodying our invention; Fig. 2, a plan view of a detainer produced by the implement. Fig. 3 represents several different forms of cutting-edges, all embodying the essential features of the invention; and Fig. 4 is a plan representing the manner of cutting two detainers from a single piece of material.

In order to enable others to make and use our invention, we will now describe the same in detail, reference being made to the drawings, where the number 1 indicates the handle of the implement, and 2 the cutting-tool, secured to a tenon on the handle by a screw or rivet, or attached in any other suitable manner. The cutting-tool is made of metal—such as sheet-steel—and is constructed with two parallel or approximately parallel cutting-edges, 3 3, separated from each other a distance corresponding to the width of the tongues and throats 4 and 5 to be produced in the piece of leather, 6, or other material from which the detainers are to be made. The parallel cutting-edges 3 are joined at one end by a connecting cutting-edge, 7, and the opposite ends of the parallel edges are turned outward to form the two laterally-projecting cutting-edges 8 8. The cutting-edge is thus brought into a shape approximating the letter U with wings thereon. The cutting-edge of the implement is of course integral, and has been described in detail as above to distinguish its construction from prior cutters. The connecting cutting-edge which joins the parallel cutting-edges may be curved or straight, and the laterally-projecting cutting-edges may be curved, straight, or angular, as in the several different shapes represented in Fig. 3. The construction of the cutter is such that at a single cut it will form one of the throats 5 and extend up the sides and a little more than half-way across the ends of each of the adjacent tongues 4.

The implement having a cutting-edge fashioned as described, and of any of the forms shown in Fig. 3, will enable us to produce two detainers without waste from a single piece of material, as represented in Fig. 4.

In cutting detainers in the manner heretofore practiced it has been customary with us to employ two chisels, one to cut the end of the tongue and the throat and one to make the cuts at the sides of the tongues. This necessitated careful marking out of the work before cutting and entailed care and much expenditure of time.

A cutting implement constructed in accordance with our present invention enables us to perform the work accurately, expeditiously, and at less expense.

Having thus described our invention, what we claim is—

A cutting implement consisting, essentially, of two separated cutting-edges, 3 3, joined at one end by a connecting cutting-edge, 7, and having at the other end the lateral outward-projecting cutting-edges 8 8, substantially as described.

In testimony whereof we sign this specification in the presence of two witnesses.

ABRAHAM MILLER.
    JOHN N. KAILER.

Witnesses:
  GEORGE D. GRASSER,
  JAMES H. RICHARDSON.